March 26, 1963    M. J. BICKETT    3,082,812
TRUCK TIRE BEAD BREAKING DEVICE

Filed July 5, 1960    2 Sheets-Sheet 1

INVENTOR.
Milford J. Bickett
BY Sam J. Slotsky
ATTORNEY

March 26, 1963   M. J. BICKETT   3,082,812
TRUCK TIRE BEAD BREAKING DEVICE

Filed July 5, 1960   2 Sheets-Sheet 2

INVENTOR.
Milford J. Bickett
BY Sam J. Slotoky
ATTORNEY

United States Patent Office 3,082,812
Patented Mar. 26, 1963

3,082,812
TRUCK TIRE BEAD BREAKING DEVICE
Milford J. Bickett, Beresford, S. Dak.
Filed July 5, 1960, Ser. No. 40,770
2 Claims. (Cl. 157—1.2)

My invention relates to a truck tire bead breaking device.

An object of my invention is to provide a hydraulically operated arrangement which will readily break the bead of a truck tire or any other type of tire from the rim in a very efficient manner, and which can be quickly operated.

A further object of my invention is to provide an arrangement whereby tires of different diameters can be accommodated by the apparatus.

A further object of my invention is to provide a device of this character which will break the bead simultaneously at several points on the periphery of the tire.

Figure 1:
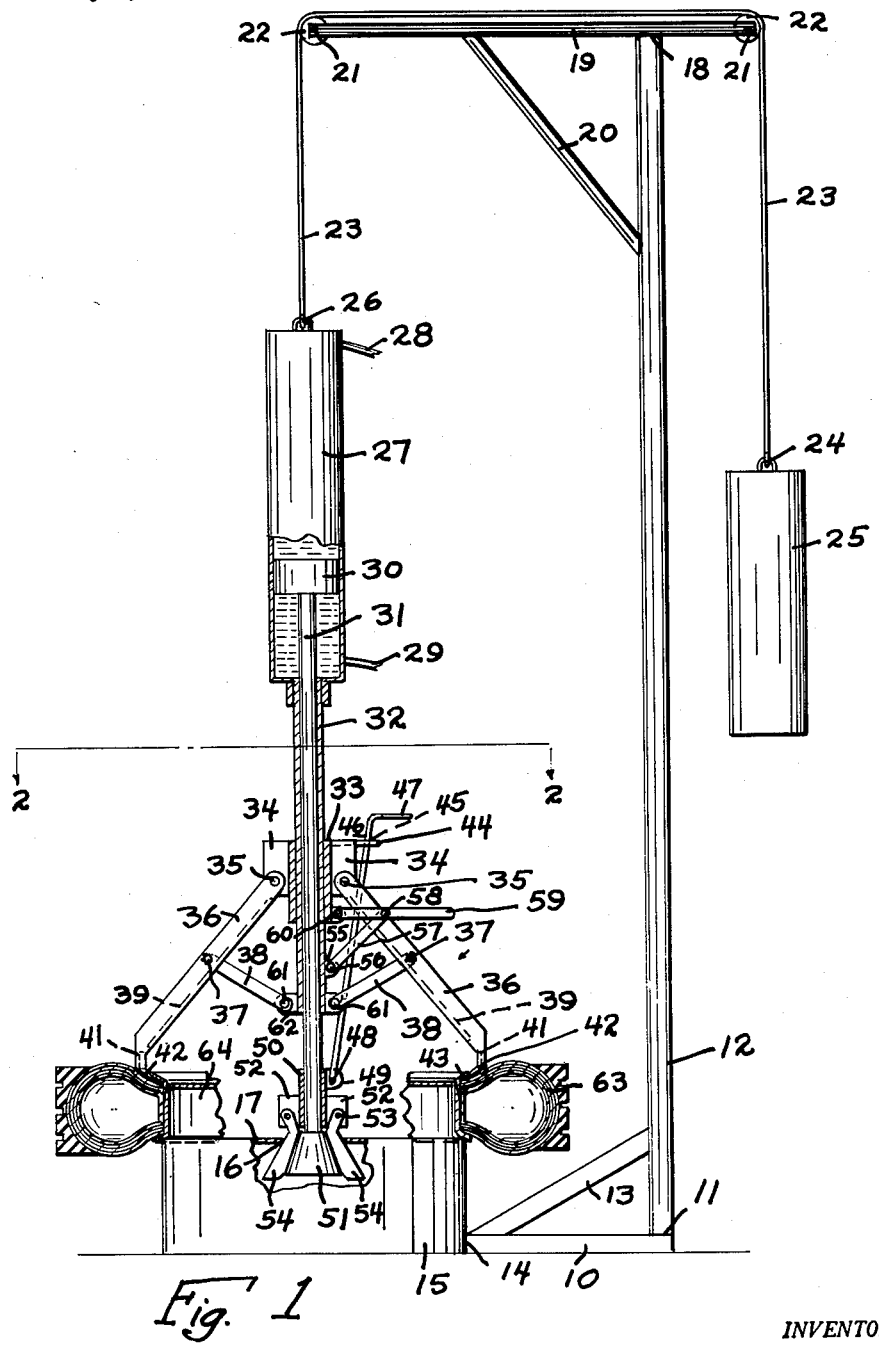
Figure 2:
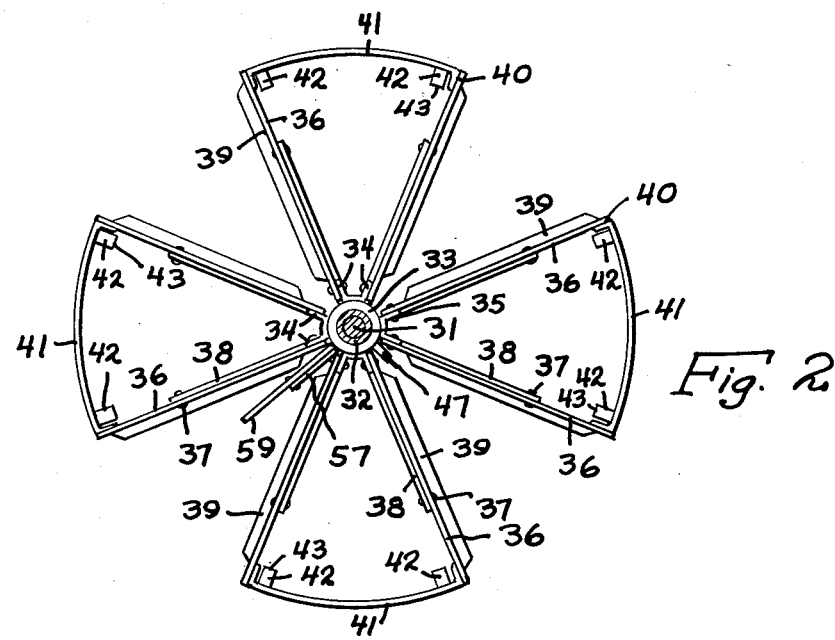
Figure 3:
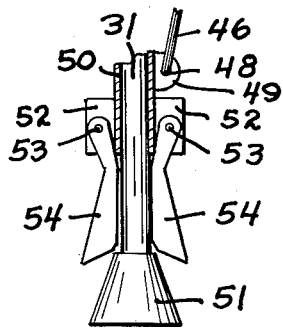
Figure 4:
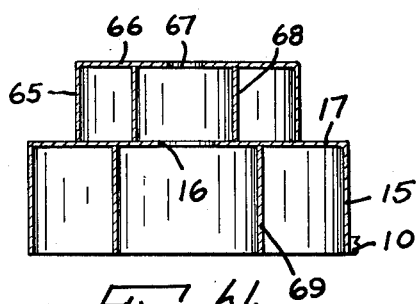

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of my device with parts being taken in cross section, FIGURE 2 is a sectional view of FIGURE 1 taken along the lines 2—2 thereof, FIGURE 3 is an enlarged detail of the lower locking arrangement, and FIGURE 4 is a sectional view of a modification.

My invention contemplates the provision of an easily operated tire bead breaking device which can be conveniently manipulated by one operator, and which will break the bead very quickly and by means of a simultaneous operation.

I have used the character 10 to designate a base structure to which is attached at 11 a vertical pipe 12, the character 13 indicating a brace.

Attached to the base 10 at 14 is a cylindrical hollow drum 15 having a central opening 16 and a top wall 17.

Attached to the top of the pipe 12 at 18 is a horizontally positioned pipe 19, the character 20 indicating a bracing member, and journalled at 21 within the ends of the pipe 19 are the pulleys 22 over which pulleys passes the cable 23 which is secured at 24 to the relatively heavy counter-weight 25.

The cable 23 is also secured as at 26 to a hydraulic cylinder 27 having the hose connections at 28 and 29, and received within the cylinder 27 is a piston 30 which is attached to the piston rod 31.

Secured to the lower end of the cylinder 27 is a further cylindrical tube 32 which is slidably received within a collar 33. Attached to the collar 33 are the ears 34 to which are pivotally attached as at 35 the links 36, and pivoted at 37 to the links 36 are the further links 38. The links 36 are braced by means of suitable flanges 39, and it will be noted from FIGURE 2 that there are eight groups of links 36 and 38, and attached between pairs of the links 36 at 40 are the arcuate straps 41, and extending from the straps 41 are the wedge-shaped radially positioned lugs 42 which have the sharpened ends 43.

Attached to the collar 33 is an ear 44 including an opening 45 for receiving the rod 46 which includes the handle portion 47, the rod 46 being pivotally attached at 48 to an ear 49, which ear is secured to a collar 50. Attached to the lower end of the rod 31 is a conical member 51, and attached to the collar 50 are four ears 52, and pivoted at 53 to each one of the four ears 52 are the four lugs 54 which are shaped as shown.

The character 55 indicates an ear which is secured to the tube 32, and pivotally attached thereto at 56 is a link 57 which is pivotally attached at 58 to the lever 59, which lever 59 is pivotally attached at 60 to a suitable ear which is attached to the sleeve or collar 33. The links 38 are pivotally attached at 61 to the ears 62 which are secured to the tube 32.

The device is operated in the following manner.

The tire, which is indicated by the character 63, is secured to the rim 64, with the rim being of more or less standard construction, and this rim is placed on the drum 15. The cylinder 27 can be readily manipulated by the operator due to the fact that the counter-weight 25 will allow the operator to raise or lower the cylinder quite easily.

By pulling upwardly on the handle 47 the rod 46 will be pulled upwardly, which will raise the collar 50 as well as the lugs 54, this action causing the lugs 54 to be freed from the sides of the conical member 51, whereby these lugs will occupy the position shown in FIGURE 3. The oil pressure is then allowed to pass through the tube 28 which forces the piston 30 downwardly, which will carry the conical member 51 downwardly also, so that this conical member can pass through the opening 16, and the lugs 54 will pass through this opening also.

By allowing the oil pressure to pass through the pipe 29, the piston 30 will rise in the cylinder 27, which will correspondingly raise the conical surface 51 relative to the lugs 54, and the rod 46 can then be allowed to drop, this action thereby providing means as shown in FIGURE 1 whereby the lugs 54 will lock against the periphery of the opening 16, thereby firmly locking the bottom of the arrangement.

By moving the lever 59 upwardly or downwardly, the lugs 42 can be adjustably positioned corresponding to the diameter of the tire, since the lever will adjust the position of the collar 33 upwardly or downwardly by this action, which will correspondingly contract the members 36 or spread them apart, so that in this manner any diameter of tire can be accommodated.

The cylinder 27 is then brought downwardly. As the lugs 43 abut against the tire wall, there will be a tendency for the collar 33 and the ears 34, etc. to gravitate downwardly due to the weight thereof, which will correspondingly cause the links or jaw elements 36 to spread apart momentarily since the pivoting points 35 will pass downwardly to thereby pivot the lower ends of the members 36 outwardly. Next, the oil pressure is passed through the pipe 29 whereby the expansion of the oil against the piston 30 will cause the cylinder 27 to be forced downwardly, which carries the tube 32 downwardly as well as the ears 62, and due to the linkages of the links 38 to the members 36, this will cause the members 36 to draw inwardly, thereby carrying the lugs 42 inwardly and breaking the bead of the tire away from the rim portions, this hydraulic pressure thereby providing means for exerting a maximum pressure inwardly radially, and whereby the simultaneous action of the eight lugs 42 will cause the breaking of the time simultaneously around the periphery thereof.

After the above described action, the oil pressure is released, whereby the natural action of the counter-weight 25 will pull the cylinder 27 upwardly, which also in effect will pull the ears 62 upwardly which will cause the members 36 to spread apart, ready for the next operation.

As a result of the above described actions it will be noted that the device can be easily controlled by the operator and can be adjusted to any size of tire.

The device can be also adapted to practically any size of tire by merely providing for different sizes of members similar to the members 15 by merely supplying additional cylindrical members such as the member 65 (see FIGURE 4) which is of smaller diameter than the member 17, whereby the member 65 can be placed on the member 17, the member 65 including the top wall 66 and the further opening 67, the character 68 indicating an additional bracing cylinder, the character 69 indicating a bracing cylinder for the member 15.

It will now be noted that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A truck tire bead breaking device comprising a support, a hydraulic cylinder suspended from said support, a lower drum having a centrally positioned opening, a piston in said cylinder, a piston rod attached to said piston, a conical member attached at the lower end of said piston rod, a slidable collar in which said piston rod is received, lugs pivotally secured to said slidable collar, said lugs having abutment surfaces adapted to abut against said conical member when said conical member is raised by said piston to thereby cause said lugs to lock within said centrally positioned opening, a tube attached to the lower end of said cylinder, said piston rod being slidably engaged within said tube, a further collar in which said tube is slidably engaged, a plurality of radially positioned jaw links pivotally attached to said further collar, said jaw links including further lugs attached thereto, links pivoted to said jaw links and to the lower end of said tube whereby movement of said tube downwardly will cause said jaw links to be forced inwardly to thereby provide means whereby said further lugs will break away a tire from a rim engaged by said tire, means for adjustably positioning said jaw links to different tire diameters including a lever pivotally attached to said further collar, a further link pivotally attached to said lever and to said tube.

2. A truck tire bead breaking device comprising a support, a hydraulic cylinder suspended from said support, a lower drum having a centrally positioned opening, a piston in said cylinder, a piston rod attached to said piston, a conical member attached at the lower end of said piston rod, a slidable collar in which said piston rod is received, lugs pivotally secured to said slidable collar, said lugs having abutment surfaces adapted to abut against said conical member when said conical member is raised by said piston to thereby cause said lugs to lock within said centrally positioned opening, a tube attached to the lower end of said cylinder, said piston rod being slidably engaged within said tube, a further collar in which said tube is slidably engaged, a plurality of radially positioned jaw links pivotally attached to said further collar, said jaw links including further lugs attached thereto, links pivoted to said jaw links and to the lower end of said tube whereby movement of said tube downwardly will cause said jaw links to be forced inwardly to thereby provide means whereby said further lugs will break away a tire from a rim engaged by said tire, means for adjustably positioning said jaw links to different tire diameters including a lever pivotally attached to said further collar, a further link pivotally attached to said lever and to said tube, means for raising said collar including a rod attached thereto, said support including pulleys, said hydraulic cylinder being suspended by a cable attached at one of its ends to said cylinder and passing over said pulleys, and a counter-weight attached to the other end of the cable.

References Cited in the file of this patent

UNITED STATES PATENTS

| | | |
|---|---|---|
| 1,578,760 | Replogle | Mar. 30, 1926 |
| 1,729,861 | Anderson | Oct. 1, 1929 |
| 2,081,402 | Krema | May 25, 1937 |
| 2,446,963 | Stolz | Aug. 10, 1948 |
| 2,485,202 | Kelly | Oct. 18, 1949 |
| 2,488,539 | Holbrook | Nov. 22, 1949 |
| 2,562,995 | Watkins | Aug. 7, 1951 |
| 2,681,692 | Weaver | June 22, 1954 |
| 2,718,258 | Hawkinson | Sept. 20, 1955 |

FOREIGN PATENTS

| | | |
|---|---|---|
| 703,086 | Great Britain | Jan. 27, 1954 |